United States Patent
Decrop et al.

(10) Patent No.: US 11,967,149 B2
(45) Date of Patent: Apr. 23, 2024

(54) INCREASING CAPABILITIES OF WEARABLE DEVICES USING BIG DATA AND VIDEO FEED ANALYSIS

(71) Applicant: INTERNATIONAL BUSINESS MACHINES CORPORATION, Armonk, NY (US)

(72) Inventors: Clement Decrop, Arlington, VA (US); Tushar Agrawal, West Fargo, ND (US); Jeremy R. Fox, Georgetown, TX (US); Sarbajit K. Rakshit, Kolkata (IN)

(73) Assignee: International Business Machines Corporation, Armonk, NY (US)

(*) Notice: Subject to any disclaimer, the term of this patent is extended or adjusted under 35 U.S.C. 154(b) by 384 days.

(21) Appl. No.: 17/342,962

(22) Filed: Jun. 9, 2021

(65) Prior Publication Data

US 2022/0398082 A1  Dec. 15, 2022

(51) Int. Cl.
| | |
|---|---|
| *G06V 20/40* | (2022.01) |
| *G06F 1/16* | (2006.01) |
| *G06F 8/61* | (2018.01) |
| *G06F 16/783* | (2019.01) |
| *G06F 18/23213* | (2023.01) |
| *G06V 40/20* | (2022.01) |
| *G06N 3/04* | (2023.01) |

(52) U.S. Cl.
CPC .............. *G06V 20/40* (2022.01); *G06F 1/163* (2013.01); *G06F 8/61* (2013.01); *G06F 16/783* (2019.01); *G06F 18/23213* (2023.01); *G06V 40/23* (2022.01); *G06N 3/04* (2013.01)

(58) Field of Classification Search
CPC ........ G06V 40/20; G06V 20/20; G06V 40/25; G06V 40/28; G06V 10/761; G06V 40/10; G06V 40/18; G06V 30/32; G06V 10/764; G06V 10/82; G06V 20/13; G06V 40/23; G06V 20/10; G06V 20/40; G06V 20/52; G06V 40/176; G06F 3/011; G06F 3/017; G06F 3/014; G06F 1/163
USPC ...................................................... 382/181
See application file for complete search history.

(56) References Cited

U.S. PATENT DOCUMENTS

| | | |
|---|---|---|
| 8,761,517 B2 | 6/2014 | Ding |
| 9,642,536 B2 | 5/2017 | Kashef |

(Continued)

OTHER PUBLICATIONS

Advisory Board, "The 5 latest health care moves by Amazon, Google, Apple, and more—Daily Briefing," Sep. 12, 2019, Retrieved from the Internet: https://www.advisory.com/daily-briefing/2019/09/12/disruptor-watch, 3 pages.

(Continued)

*Primary Examiner* — Ajibola A Akinyemi
(74) *Attorney, Agent, or Firm* — Tihon Poltavets

(57) ABSTRACT

According to one embodiment, a method, computer system, and computer program product for wearable device activity analysis is provided. A computer receives a video of an activity. The computer identifies the activity based on analyzing the video. The computer identifies body movements from the video. The computer correlates the activity and the body movements to a wearable device. The computer identifies additional inputs for the activity and updates the wearable device based on the identified additional inputs.

18 Claims, 5 Drawing Sheets

(56) References Cited

U.S. PATENT DOCUMENTS

| | | | |
|---|---|---|---|
| 10,136,389 B2 | 11/2018 | Kang | |
| 10,332,374 B2 | 6/2019 | Kegley | |
| 10,484,568 B2 | 11/2019 | Wexler | |
| 10,847,048 B2 | 11/2020 | Kang | |
| 10,929,818 B2 | 2/2021 | Zhang | |
| 10,943,119 B2 | 3/2021 | Samanta | |
| 2010/0208035 A1* | 8/2010 | Pinault | G06V 40/10 348/46 |
| 2015/0242707 A1 | 8/2015 | Wilf | |
| 2016/0037055 A1* | 2/2016 | Waddington | H04N 23/62 348/211.8 |
| 2017/0300755 A1* | 10/2017 | Bose | G11B 27/10 |
| 2018/0114063 A1 | 4/2018 | Wexler | |
| 2018/0140078 A1 | 5/2018 | Williamson | |
| 2018/0232706 A1 | 8/2018 | Zhang | |
| 2018/0296135 A1 | 10/2018 | Bonnet | |
| 2018/0336772 A1 | 11/2018 | Ranjanghatmuralidhar | |
| 2018/0352166 A1 | 12/2018 | Silic | |
| 2019/0019393 A1 | 1/2019 | Kegley | |
| 2019/0130184 A1 | 5/2019 | Samanta | |
| 2020/0111345 A1 | 4/2020 | Li | |
| 2020/0293179 A1 | 9/2020 | Anderson | |
| 2020/0297241 A1 | 9/2020 | Wagner | |

OTHER PUBLICATIONS

Angelides et al., "Wearable Data Analysis, Visualization and Recommendations on the Go Using Android Middleware," Multimed Tools Appl (2018) 77: pp. 26397-26448, https://doi.org/10.1007/s11042-018-5867-y.

Ayata et al., "Emotion Based Music Recommendation System Using Wearable Physiological Sensors" IEEE Transactions on Consumer Electronics, vol. 14, No. 8, May 2018, 8 pages.

Buttussi et al., "MOPET: A Context-Aware And User-Adaptive Wearable System for Fitness Training," Elsevier, Artificial Intelligence in Medicine (2008) 42, pp. 153-163.

IBM "Improve engagement for better outcomes," IBM Healthcare Patient Portal Solutions, Accessed Apr. 20, 2021, Retrieved from the Internet: https://www.ibm.com/industries/healthcare/solutions/individual-insights, 6 pages.

IBM, "Make your data work for you," IBM Population Health Management Solutions, Accessed Apr. 20, 2021, Retrieved from the Internet: https://www.ibm.com/industries/healthcare/solutions/population-health-insights, 6 pages.

Manogaran et al., "Wearable IoT Smart-Log Patch: An Edge Computing-Based Bayesian Deep Learning Network System for Multi Access Physical Monitoring System," Sensors 2019, 19, 3030; doi:10.3390/s19133030, Published Jul. 9, 2019, 18 pages.

Mell et al., "The NIST Definition of Cloud Computing", National Institute of Standards and Technology, Special Publication 800-145, Sep. 2011, 7 pages.

Young, "Immersive Telepresence and Remote Collaboration using Mobile and Wearable Devices," IEEE Transactions on Visualization and Computer Graphics, May 2019, vol. 25, No. 5, pp. 1908-1918.

* cited by examiner

INCREASING CAPABILITIES OF WEARABLE DEVICES USING BIG DATA AND VIDEO FEED ANALYSIS

BACKGROUND

The present invention relates, generally, to the field of computing, and more particularly to using big data and video feed analysis to increase capabilities of wearable devices.

Big data typically applies to data sets whose size or type is beyond the ability of traditional relational databases to capture, manage and process with low latency. Analysis of big data allows analysts, researchers and business users to make better and faster decisions using data that was previously inaccessible or unusable. Businesses can use advanced analytics techniques, such as text analytics, machine learning, predictive analytics, data mining, statistics and natural language processing, to gain new insights from previously untapped data sources independently or together with existing enterprise data.

Wearable devices are smart electronic devices that typically use micro-controllers worn close to or on the surface of the skin. The wearable devices may detect, analyze, and transmit information concerning body signals, such as vital signs, and ambient data which allow in some cases immediate biofeedback to the wearer. Wearable devices, such as activity trackers, are an example of the Internet of Things, since "things" such as electronics, software, sensors, and connectivity are effectors that enable objects to exchange data through the internet with other connected devices, without requiring human intervention. Wearable devices have a variety of applications which grows as the field itself expands. It appears prominently in consumer electronics with the popularization of the smartwatches and activity trackers. Apart from commercial uses, wearable devices are being incorporated into navigation systems, advanced textiles, and healthcare.

SUMMARY

According to one embodiment, a method, computer system, and computer program product for wearable device activity analysis is provided. A computer receives a video of an activity. The computer identifies the activity based on analyzing the video. The computer identifies body movements from the video. The computer correlates the activity and the body movements to a wearable device. The computer identifies additional inputs for the activity and updates the wearable device based on the identified additional inputs.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
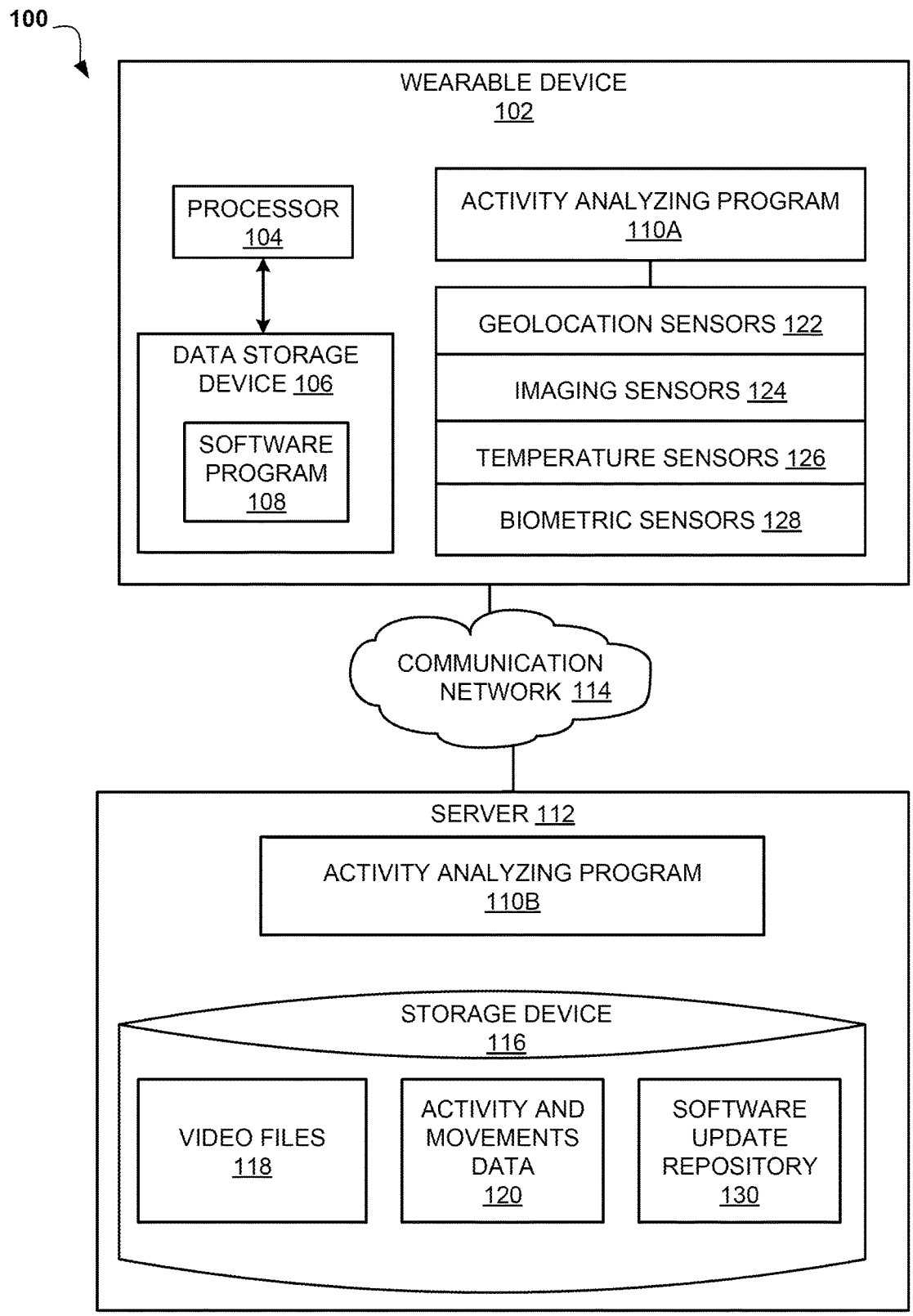
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to using big data and video feed analysis to increase capabilities of wearable devices. The following described exemplary embodiments provide a system, method, and program product to, among other things, identify a physical or mental activity the user of a wearable device is utilizing and updating the software of the user device or suggesting an additional wearable device in order to measure the activity with associated sensors for measuring that activity. Therefore, the present embodiment has the capacity to improve the technical field of video data analysis of an activity coupled with data from the wearable sensors by identifying an activity from the video and determining the corresponding inputs from sensors of the wearable device to track that activity.

As previously described, wearable devices are smart electronic devices that typically use micro-controllers, that are worn close to or on the surface of the skin. The wearable devices may detect, analyze, and transmit information concerning body signals such as vital signs, and ambient data which allow in some cases immediate biofeedback to the wearer. Wearable devices, such as activity trackers, are one of the examples of the Internet of Things, since "things" such as electronics, software, sensors, and connectivity are effectors that enable objects to exchange data through the internet with other connected devices, without requiring human intervention. Wearable devices have a variety of applications which grows as the field itself expands. It appears prominently in consumer electronics with the popularization of the smartwatches and activity trackers. Apart from commercial uses, wearable devices are being incorporated into navigation systems, advanced textiles, and healthcare.

Currently, various types of wearable devices are available to users. These wearable devices may gather different types of input from the human body and the wearer's surroundings. For example, the inputs may be biometric data, muscle movement patterns, body movement patterns, finger movement patterns, facial patterns, temperature, location, humidity, acceleration, velocity, orientation, oxygenation rate, light intensity, etc. Furthermore, wearable devices may gather different types of movement patterns to identify when the user is walking, sitting, running, or doing other types of activity. In order to identify the various inputs from the user, the wearable devices use different types of sensors. Oftentimes, the data from various sensors is not analyzed or used by the wearable device due to lack of software that uses the received data. In another case, additional sensors are required in order to identify and analyze a specific body, cognitive, or health activity of the user. As such, it may be advantageous to, among other things, implement a system that analyzes videos to identify a correlation between body-generated signals with different types of activities, emotional states or performances, and identifies what inputs can be gathered using sensors of wearable devices for different types of computations and recommendations.

According to one embodiment, an activity analyzing program may analyze various video recordings from a repository to identify body movements and correlate the movements to the sensor signals and apply this analysis to the signal from the wearable device of the user to match user activity to one of the activities in the video recordings. Then, based on the identified activity, the activity analyzing program may recommend and/or install a software that utilizes the readings from various sensors in an optimal manner for the user or recommend a wearable device when the required sensors are absent from the wearable device of the user.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to analyze video and wearable device data, classify the data to different activities and, by matching user wearable device data to one of the activities, install optimal software for the wearable device, recommend a new wearable device and/or recommend a software or an additional wearable device for the activity the user is practicing.

Referring to FIG. 1, an exemplary networked computer environment 100 is depicted, according to at least one embodiment. The networked computer environment 100 may include wearable device 102 and a server 112 interconnected via a communication network 114. According to at least one implementation, the networked computer environment 100 may include a plurality of wearable devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Wearable device 102 may include a processor 104, at least one of the geolocation sensors 122, imaging sensors 124, temperature sensors 126, biometric sensors 128. In addition, the wearable device 102 may include a data storage device 106 that is enabled to host and run a software program 108 and an activity analyzing program 110A and communicate with the server 112 via the communication network 114, in accordance with one embodiment of the invention. Wearable device 102 may be any smart device that is capable of receiving and analyzing inputs from various sensors related to a human body or to the surrounding environment. For example, the wearable device 102 may be a mobile device, a smart watch, a telephone, a personal digital assistant, a smart ring, a smart bracelet, a smart camera or any type of wearable devices having at least one of the geolocation sensors 122, imaging sensors 124, temperature sensors 126, biometric sensors 128. As will be discussed with reference to FIG. 3, the wearable device 102 may include internal components 302a and external components 304a, respectively. According to an example embodiment, geolocation sensors 122 may be any sensor that may identify a location of the user, such as a GPS sensor, Bluetooth sensor, BLE (Bluetooth Low Energy) sensor, UWB (ultra-wideband) sensor, cellphone antenna capable of triangulation, video camera coupled with image processing to identify location, lidar sensor, etc. The imaging sensors 124 may be any devices capable of recording or analyzing human body movement, such as a video camera or an infra-red camera. The temperature sensors 126 may be one or more sensors capable of measuring body temperature, the temperature of the surrounding environment or humidity of the air. The biometric sensors 128 may be one or more sensors capable of measuring accelerations, movements, vibrations of the body, microphones, blood oxygenation sensors, heart rate monitor sensors, ECG sensors, blood sugar level sensors or any other sensor capable of measuring any information related to the body of a user.

The server computer 112 may be a laptop computer, netbook computer, personal computer (PC), a desktop computer, or any programmable electronic device or any network of programmable electronic devices capable of hosting and running an activity analyzing program 110B and a storage device 116 and communicating with the wearable device 102 via the communication network 114, in accordance with embodiments of the invention. The storage device 116 may be configured to store and access video files 118, activity and movements data 120, and software repository 130. The video files 118 may be any type of video repository that includes video data while performing various activities. In another embodiment, any video file from video files 118 may be accompanied with the corresponding data from various sensors from the wearable devices such as wearable device 102 that was used during the video recording. The activity and movements data 120 may be a database that stores and updates relations between activities, body movements, associated with the activity and body movement sensors, required input data to analyze each body movement during an identified activity. In addition, the activity and movements data 120 may have records of compatible wearable devices that may record and analyze the input data from available sensors and corresponding one or more links to software programs in software update repository 130 that are used for recording and analyzing inputs from the sensors to analyze and display to the user relevant data of the activity. The software repository 130 is a repository of software drivers and patches that are used to access and analyze data from various sensors of the wearable device 102. For example, if an ECG sensor is capable of measuring a triceps muscle contraction based on analyzing different electromagnetic frequencies, a special software patch that utilizes the ECG sensor for triceps muscle analysis may be stored on that repository. As will be discussed with reference to FIG. 3, the server computer 112 may include internal components 302b and external components 304b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the activity analyzing program 110A, 110B may be a program capable of associating an activity performed by the user with the activity on one or more videos and thus, identifying the optimal software and wearable device for analyzing the activity. The activity analyzing method is explained in further detail below with respect to FIG. 2.

Figure 2:
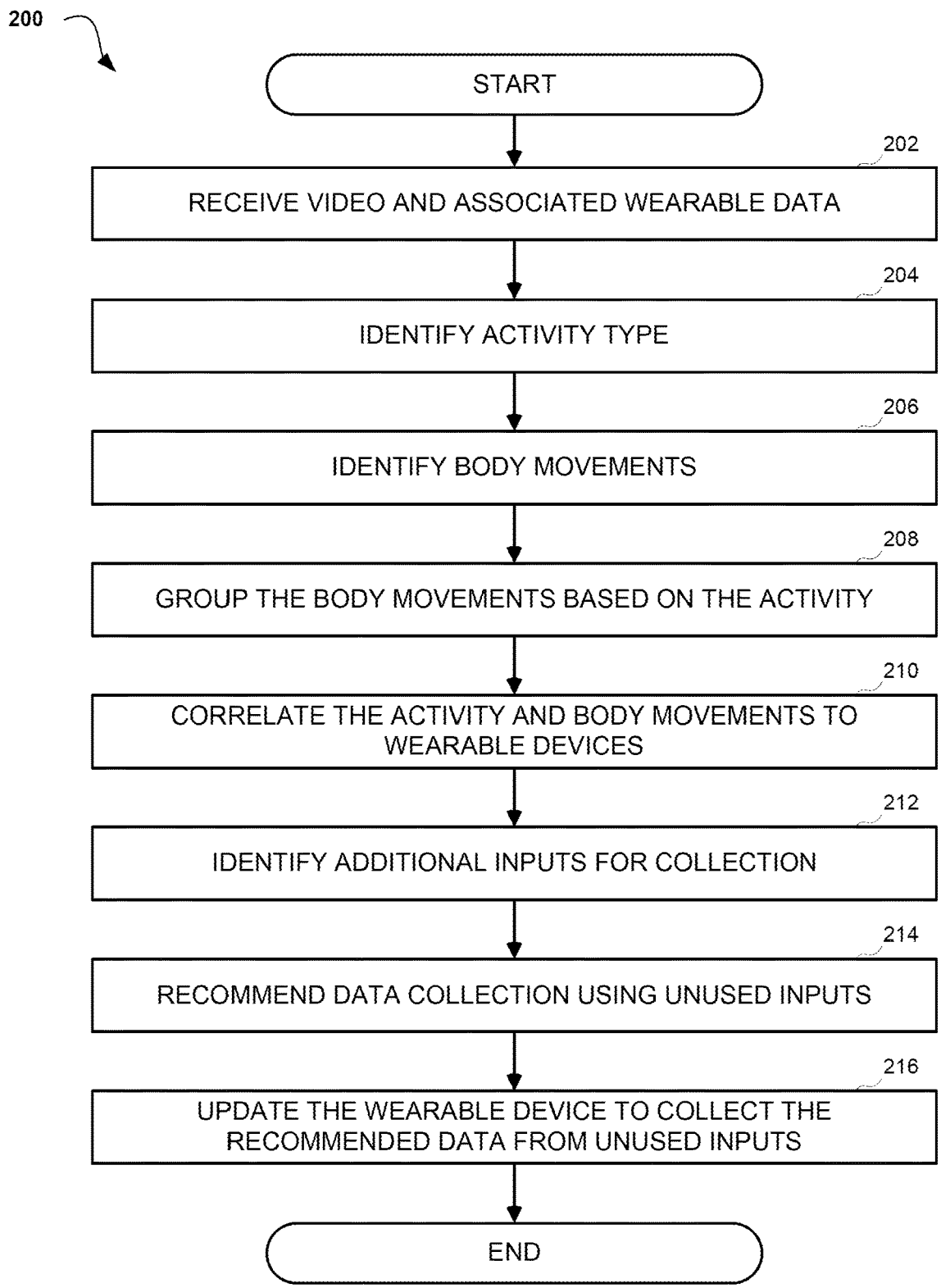
FIG. 2 is an operational flowchart illustrating an activity analyzing process according to at least one embodiment.

Referring now to FIG. 2, an operational flowchart illustrating an activity analyzing process 200 is depicted according to at least one embodiment. At 202, the activity analyzing program 110A, 110B receives video and associated wearable data. According to an example embodiment, the activity analyzing program 110A, 110B may receive one or more videos of the user while performing an activity. The video may be coupled with data from various sensors available on the wearable device 102 during the video recording.

Next, at 204, the activity analyzing program 110A, 110B identifies an activity type. According to an example embodiment, the activity analyzing program 110A, 110B identifies modalities performed by a user during the activity. The modalities may be determined by analyzing and comparing the received video data to videos in the video files 118. For example, the videos in video files 118 may be tagged such as "swimming", "cooking", etc. In another embodiment, the activity analyzing program 110A, 110B may use a convolutional neural network (CNN) that was trained using video files 118 or a specific set of modalities to identify an activity. In a further embodiment, when the data from various sensors is available with the video, the activity analyzing program 110A, 110B may use a previously trained CNN to identify the activity by analyzing recorded sensors data. In another embodiment, the activity analyzing program 110A, 110B may identify the activity using a fuzzy logic extracted from the video and sensors data recorded with the video. For example, if a user uses a smartwatch and the activity analyzing program 110A, 110B determines that the recorded heartbeat is high and geolocation of the video on a map shows that the user is located in a body of water, the activity analyzing program 110A, 110B may identify the activity as swimming. In another embodiment, when the activity analyzing program 110A, 110B identifies that the average heartbeat of a user is high and there is a sound of music, the activity analyzing program 110A, 110B may identify the activity as dancing. In another embodiment, the activity analyzing program 110A, 110B may use speech-to-text and natural language processing of the sound from the video to identify the activity. For example, the activity analyzing program 110A, 110B may use techniques such as Bag of Words (BoW), Word2Vec, or BERT model to identify the activity from the text.

Then, at 206, the activity analyzing program 110A, 110B identifies body movements. According to an example embodiment, the activity analyzing program 110A, 110B may identify types of body movement patterns and associated parameters like body movement mechanics, relative movements of different body parts, speed of activity and different body parts using image processing. Furthermore, the activity analyzing program 110A, 110B may perform a sentiment analysis to identify user comfortability level in performing the activity. For example, the activity analyzing program 110A, 110B may use a measured heart rate to identify user comfortability. In another embodiment, the activity analyzing program 110A, 110B may analyze facial expressions of the user during the activity or speed and acceleration of various body parts using an accelerometer.

Next, at 208, the activity analyzing program 110A, 110B groups the body movements based on the activity. According to an example embodiment, the activity analyzing program 110A, 110B groups identified movements based on the activity type, such as moving of the right or left hand if the user plays tennis. According to an example embodiment, the activity analyzing program 110A, 110B may group reoccurring patterns in body movements using a clustering technique, such as k-means clustering algorithm.

Then, at 210, the activity analyzing program 110A, 110B correlates the activity and body movements to the wearable device. According to an example embodiment, the activity analyzing program 110A, 110B may identify the required input signals required for a specific activity by searching for the activity, or clustered body movements or a similar activity in the activity and movement data 120. As previously mentioned, activity and movement data 120 comprises records of activities and may be associated with each activity and/or body movement inputs and corresponding to the movements analysis software and wearable devices that trach that movements. By matching a current activity to a record in the activity and movement data 120, the activity analyzing program 110A, 110B may identify the preferred wearable devices and inputs required from the sensors in order to operate the analyzing software. The matching may be performed by transferring the data to a vector and using vector comparison to determine a similarity between the activity of the user to one or more activities in activity and movement data 120. For example, if the analyzed video is of a user playing badminton, if the activity and movement data 120 does not have a record for badminton, a vectorization of body movements may show a strong similarity to tennis, thus similar sensors used for tennis may be required to analyze badminton.

Next, at 212, the activity analyzing program 110A, 110B identifies additional inputs for collection. According to an example embodiment, the activity analyzing program 110A, 110B may identify a type of analysis that may be performed based on the gathered data, and what input data is required to be captured from various sensors and the location of the sensors based on step 210 above. According to an example embodiment, the activity analyzing program 110A, 110B may identify inputs that are required by the analyzing software but are absent from the current wearable device. This may be performed by analyzing a video and accessing BIOS of wearable device 102, by analyzing data from the available sensors or using other available methods. For example, if the activity analyzing program 110A, 110B determined that a user plays tennis, it may identify that the location of the smartwatch is not optimal because a user plays with a right hand and the smart watch is located on the left hand.

Then, at 214, the activity analyzing program 110A, 110B recommends data collection using unused inputs. According to an example embodiment, the activity analyzing program 110A, 110B detects whether the associated with the unused inputs sensors exist in the wearable devices 102. When the wearable device 102 has no inputs or the inputs are not from the optimal location of the wearable device 102, the activity analyzing program 110A, 110B may recommend the user, using a graphical user interface (GUI) and via the internet, to acquire or use a different wearable device that has the required inputs, or change the location of the wearable device if the inputs exist but not in the preferred location of the body. In another embodiment, the activity analyzing program 110A, 110B may send a recommendation to a manufacturer via internet to install additional sensors on a wearable device, or a recommendation to manufacture a new wearable device in a specific place of the body.

Next, at 216, the activity analyzing program 110A, 110B updates the wearable device to collect the recommended data from unused inputs. According to an example embodiment, the activity analyzing program 110A, 110B may identify drivers or specific software programs associated with the available sensors and the activity of the user that are typically used to track and analyze the activity and installs those software updates on the wearable device 102 from software update repository 102.

It may be appreciated that FIG. 2 provides only an illustration of one implementation and does not imply any limitations with regard to how different embodiments may be implemented. Many modifications to the depicted environments may be made based on design and implementation requirements. For example, many users may use various wearable devices and the data may be analyzed and stored to improve activity identification and data collection.

Figure 3:
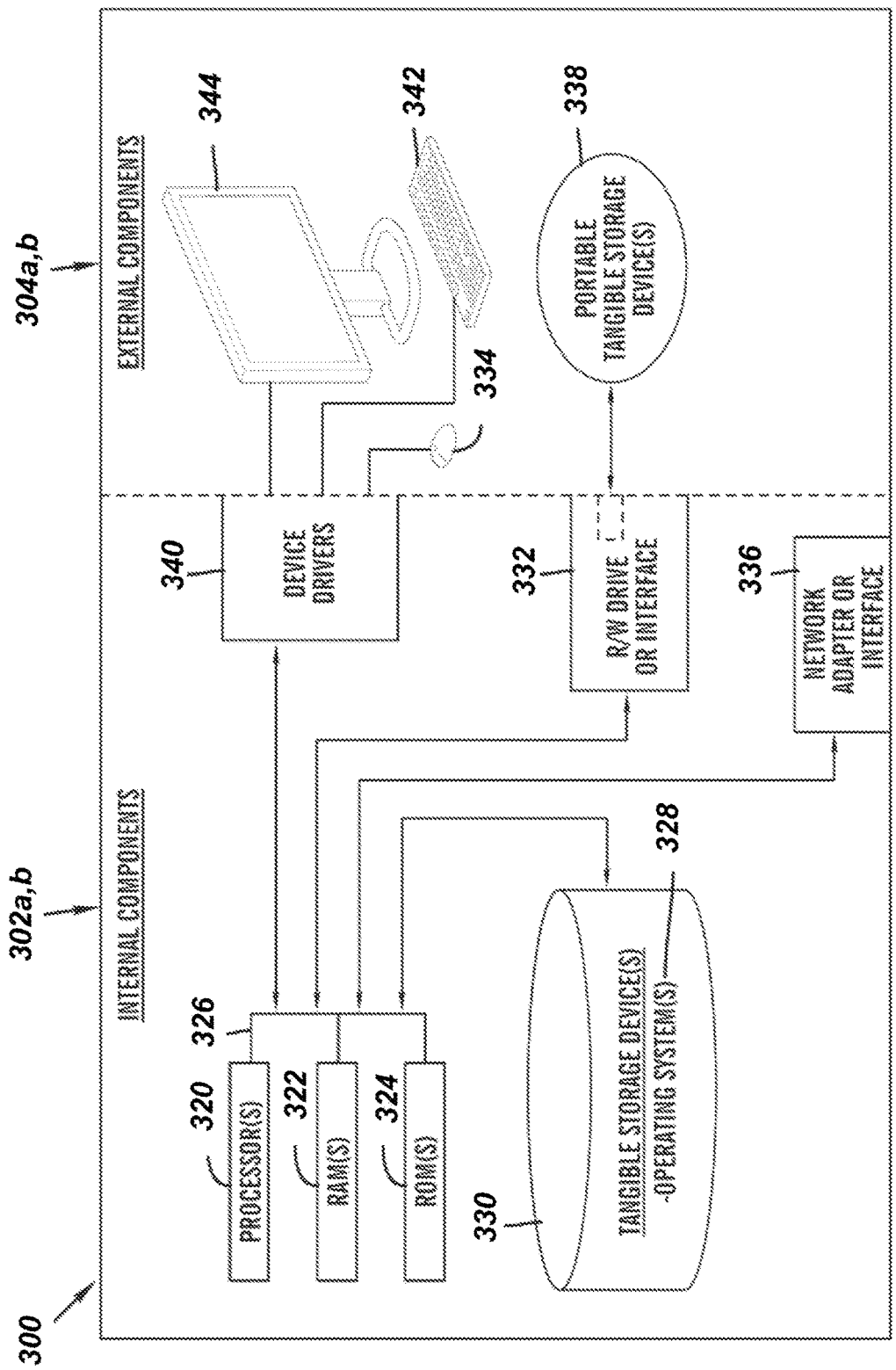
FIG. 3 is a block diagram of internal and external components of computers and servers depicted in FIG. 1 according to at least one embodiment.

FIG. 3 is a block diagram 300 of internal and external components of the wearable device 102 and the server 112 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 302, 304 is representative of any electronic device capable of executing machine-readable program instructions. The data processing system 302, 304 may be representative of a smart phone, a computer system, PDA, or other electronic devices. Examples of computing systems, environments, and/or configurations that may represented by the data processing system 302, 304 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The wearable device 102 and the server 112 may include respective sets of internal components 302 a,b and external components 304 a,b illustrated in FIG. 3. Each of the sets of internal components 302 include one or more processors 320, one or more computer-readable RAMs 322, and one or more computer-readable ROMs 324 on one or more buses 326, and one or more operating systems 328 and one or more computer-readable tangible storage devices 330. The one or more operating systems 328, the software program 108 and the activity analyzing program 110A in the wearable device 102, and the activity analyzing program 110B in the server 112 are stored on one or more of the respective computer-readable tangible storage devices 330 for execution by one or more of the respective processors 320 via one or more of the respective RAMs 322 (which typically include cache memory). In the embodiment illustrated in FIG. 3, each of the computer-readable tangible storage devices 330 is a magnetic disk storage device of an internal hard drive. Alternatively, each of the computer-readable tangible storage devices 330 is a semiconductor storage device such as ROM 324, EPROM, flash memory or any other computer-readable tangible storage device that can store a computer program and digital information.

Each set of internal components 302 a,b also includes a R/W drive or interface 332 to read from and write to one or more portable computer-readable tangible storage devices 338 such as a CD-ROM, DVD, memory stick, magnetic tape, magnetic disk, optical disk or semiconductor storage device. A software program, such as the activity analyzing program 110A, 110B, can be stored on one or more of the respective portable computer-readable tangible storage devices 338, read via the respective R/W drive or interface 332, and loaded into the respective hard drive 330.

Each set of internal components 302 a,b also includes network adapters or interfaces 336 such as a TCP/IP adapter cards, wireless Wi-Fi interface cards, or 3G or 4G wireless interface cards or other wired or wireless communication links. The software program 108 and the activity analyzing program 110A in the wearable device 102 and the activity analyzing program 110B in the server 112 can be downloaded to the wearable device 102 and the server 112 from an external computer via a network (for example, the Internet, a local area network or other wide area network) and respective network adapters or interfaces 336. From the network adapters or interfaces 336, the software program 108 and the activity analyzing program 110A in the wearable device 102 and the activity analyzing program 110B in the server 112 are loaded into the respective hard drive 330. The network may comprise copper wires, optical fibers, wireless transmission, routers, firewalls, switches, gateway computers and/or edge servers.

Each of the sets of external components 304 a,b can include a computer display monitor 344, a keyboard 342, and a computer mouse 334. External components 304 a,b can also include touch screens, virtual keyboards, touch pads, pointing devices, and other human interface devices. Each of the sets of internal components 302 a,b also includes device drivers 340 to interface to computer display monitor 344, keyboard 342, and computer mouse 334. The device drivers 340, R/W drive or interface 332, and network adapter or interface 336 comprise hardware and software (stored in storage device 330 and/or ROM 324).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
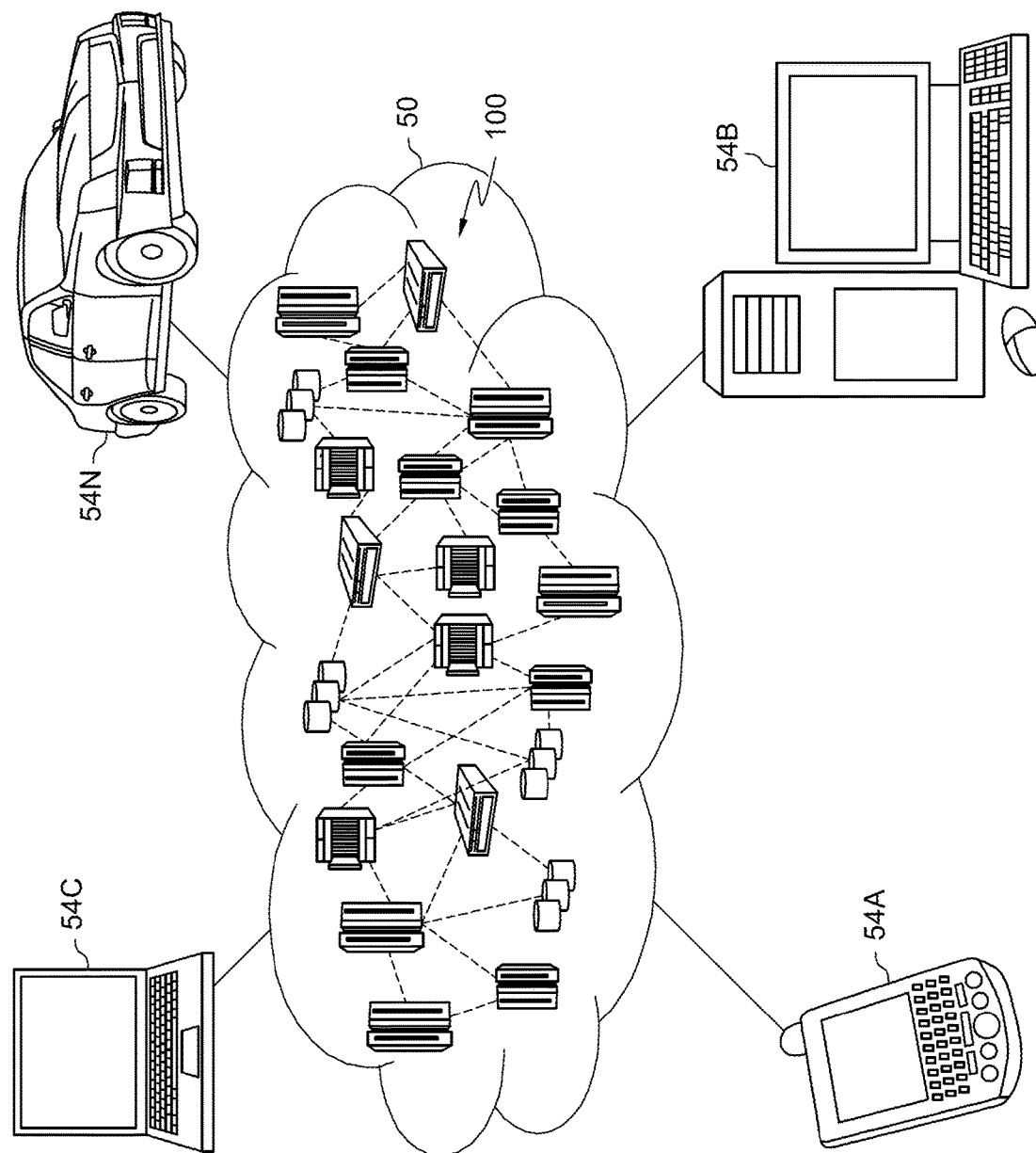
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
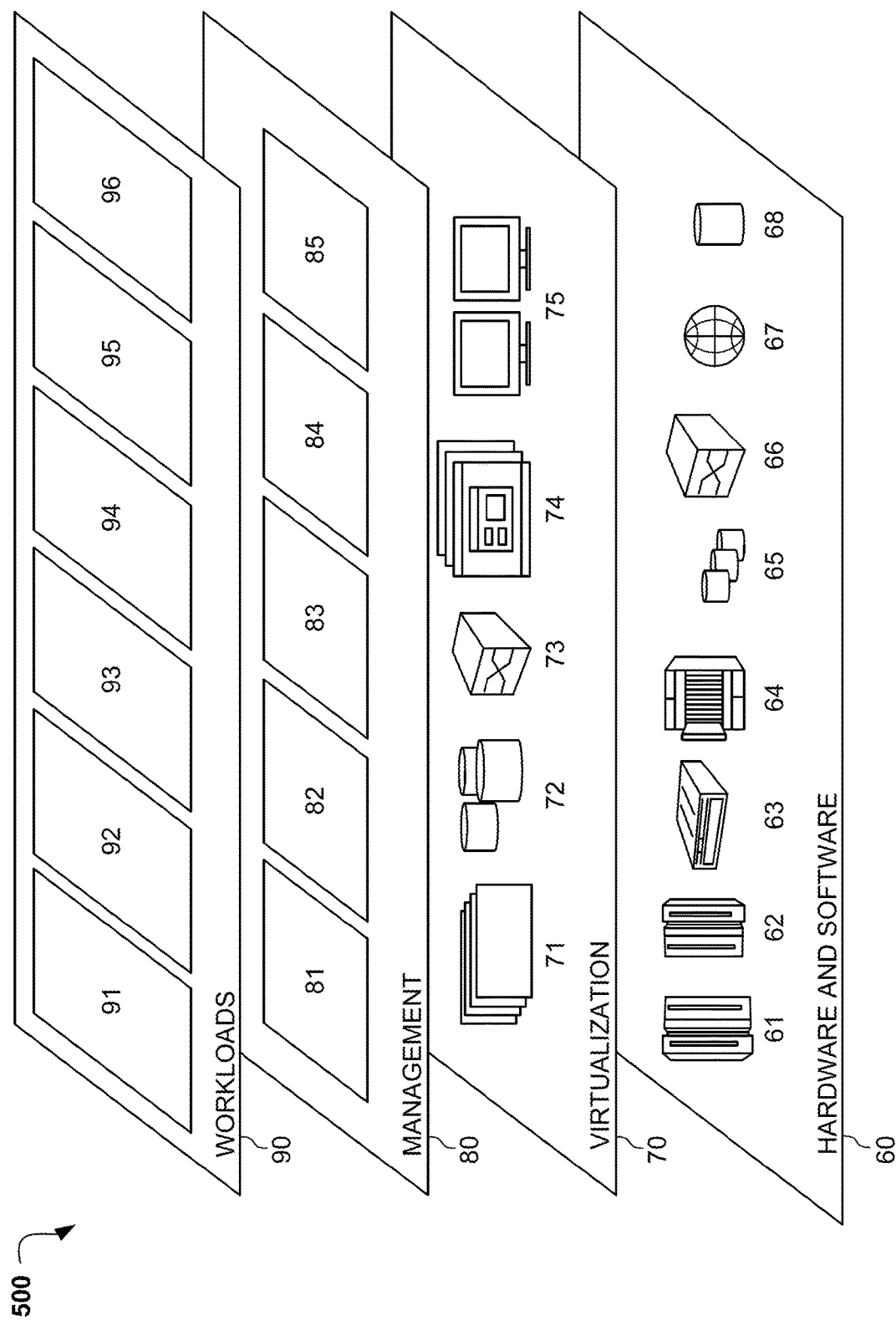
FIG. 5 depicts abstraction model layers according to an embodiment of the present invention.

Referring now to FIG. 5, a set of functional abstraction layers 500 provided by cloud computing environment 50 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and wearable device activity analyzer 96. Wearable device activity analyzer 96 may relate to analyzing a video of a user to detect an activity and body movements and, based on the activity and body movements, make recommendations and install software to utilize the available sensors for the identified activity.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for wearable device activity analysis, the method comprising:
receiving a video of an activity;
identifying the activity based on analyzing body movements in the video;
identifying the body movements from the video;
correlating the activity and the body movements to a wearable device;
identifying additional inputs for the activity based on the correlated activity and the body movements; and
updating the wearable device based on the identified additional inputs, wherein the updating includes,
identifying a software program associated with available sensors on the wearable device, and the correlated activity and the body movements, and
installing, on the wearable devices, the software program.

2. The method of claim 1 further comprising:
identifying unused inputs that are absent from the wearable device, wherein the unused inputs correlated to the activity and the body movements from the video; and
recommending adding one or more sensors to the wearable device based on the unused inputs.

3. The method of claim 1, wherein analyzing the video utilizes a convolutional neural network.

4. The method of claim 1, wherein identifying the body movements from the video further comprises:
identifying the body movements using image processing; and
clustering the identified body movements using K-means clustering algorithm.

5. The method of claim 1, wherein correlating the activity and the body movements to a wearable device further comprises:
identifying one or more inputs for the activity using the activity and the body movements; and
determining that sensors of the wearable device have the one or more inputs.

6. The method of claim 5, wherein identifying additional inputs for the activity further comprises:
based on determining that sensors of the wearable device lack the one or more inputs identifying the additional inputs as inputs that have no corresponding sensors in the wearable device.

7. A computer system for wearable device activity analysis, the computer system comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
receiving a video of an activity;
identifying the activity based on analyzing body movements in the video;
identifying the body movements from the video;
correlating the activity and the body movements to a wearable device;
identifying additional inputs for the activity based on the correlated activity and the body movements; and
updating the wearable device based on the identified additional inputs, wherein the updating includes,
identifying a software program associated with available sensors on the wearable device, and the correlated activity and the body movements, and
installing, on the wearable devices, the software program.

8. The computer system of claim 7 further comprising:
identifying unused inputs that are absent from the wearable device, wherein the unused inputs correlated to the activity and the body movements from the video; and
recommending adding one or more sensors to the wearable device based on the unused inputs.

9. The computer system of claim 7, wherein analyzing the video utilizes a convolutional neural network.

10. The computer system of claim 7, wherein identifying the body movements from the video further comprises:
identifying the body movements using image processing; and
clustering the identified body movements using K-means clustering algorithm.

11. The computer system of claim 7, wherein correlating the activity and the body movements to a wearable device further comprises:
identifying one or more inputs for the activity using the activity and the body movements; and
determining that sensors of the wearable device have the one or more inputs.

12. The computer system of claim 11, wherein identifying additional inputs for the activity further comprises:
based on determining that sensors of the wearable device lack the one or more inputs identifying the additional inputs as inputs that have no corresponding sensors in the wearable device.

13. A computer program product for wearable device activity analysis, the computer program product comprising:
one or more computer-readable tangible storage medium and program instructions stored on at least one of the one or more tangible storage medium, the program instructions executable by a processor, the program instructions comprising:
program instructions to receive a video of an activity;
program instructions to identify the activity based on analyzing body movements in the video;
program instructions to identify the body movements from the video;
program instructions to correlate the activity and the body movements to a wearable device;
program instructions to identify additional inputs for the activity based on the correlated activity and the body movements; and
program instructions to update the wearable device based on the identified additional inputs, wherein the program instructions to update includes, program instructions to identify a software program associated with available sensors on the wearable device, and the correlated activity and the body movements, and program instructions to install, on the wearable devices, the software program.

14. The computer program product of claim 13 further comprising:

program instructions to identify unused inputs that are absent from the wearable device, wherein the unused inputs correlated to the activity and the body movements from the video; and program instructions to recommend adding one or more sensors to the wearable device based on the unused inputs.

15. The computer program product of claim 13, wherein program instructions to analyze the video utilizes a convolutional neural network.

16. The computer program product of claim 13, wherein program instructions to identify the body movements from the video further comprises:

program instructions to identify the body movements using image processing; and program instructions to cluster the identified body movements using K-means clustering algorithm.

17. The computer program product of claim 13, wherein program instructions to correlate the activity and the body movements to a wearable device further comprises:

program instructions to identify one or more inputs for the activity using the activity and the body movements; and program instructions to determine that sensors of the wearable device have the one or more inputs.

18. The computer program product of claim 17, wherein program instructions to identify additional inputs for the activity further comprises:

based on determining that sensors of the wearable device lack the one or more inputs program instructions to identify the additional inputs as inputs that have no corresponding sensors in the wearable device.

* * * * *